United States Patent [19]

Haag

[11] Patent Number: 5,492,158
[45] Date of Patent: Feb. 20, 1996

[54] SYSTEM FOR COLLECTING ORGANIC MATERIAL UNDERNEATH RAIL VEHICLES

[76] Inventor: Werner Haag, Auf Der Heide 46, D-27711 Osterholz-Scharmbeck, Germany

[21] Appl. No.: 185,929
[22] PCT Filed: Jul. 29, 1992
[86] PCT No.: PCT/DE92/00640
  § 371 Date: Jan. 25, 1994
  § 102(e) Date: Jan. 25, 1994
[87] PCT Pub. No.: WO93/03303
  PCT Pub. Date: Feb. 18, 1993

[30] Foreign Application Priority Data

Jul. 30, 1991 [DE] Germany .......................... 41 25 202.0

[51] Int. Cl.⁶ ............................ F16N 31/00; E01B 19/00; B61K 11/00
[52] U.S. Cl. ............... 141/98; 141/86; 184/106; 238/1; 238/2; 137/312; 220/573
[58] Field of Search .................................. 141/86, 88, 98, 141/311 A; 220/571, 573; 184/106; 137/312, 314; 238/1, 2, 6

[56] References Cited

U.S. PATENT DOCUMENTS

| | | | |
|---|---|---|---|
| 3,141,522 | 7/1964 | Fitzpatrick | 184/106 |
| 3,722,626 | 3/1973 | Stack | 184/106 |
| 4,010,896 | 3/1977 | Stockton | 238/2 |
| 4,484,661 | 11/1984 | Evenson | 184/106 |
| 4,651,887 | 3/1987 | Patrick | 141/98 X |
| 4,875,537 | 10/1989 | Garnatz et al. | 180/69.1 |
| 5,199,457 | 4/1993 | Miller | 137/312 |
| 5,224,622 | 7/1993 | Graham et al. | 220/571 |

FOREIGN PATENT DOCUMENTS

| | | | |
|---|---|---|---|
| 420363 | 4/1991 | European Pat. Off. | |
| 0517947 | 12/1992 | European Pat. Off. | 184/106 |
| 2656241 | 6/1991 | France | |
| 3511552 | 10/1985 | Germany | |
| 0265187 | 2/1989 | Germany | 238/1 |
| 0624982 | 9/1978 | U.S.S.R. | 238/2 |

Primary Examiner—J. Casimer Jacyna
Attorney, Agent, or Firm—Collard & Roe

[57] ABSTRACT

Described is a system for collecting organic material, such as oil, etc., underneath rail vehicles, in particular railway locomotives, the systen having at least one absorption material in at least one pan.

7 Claims, 3 Drawing Sheets

5,492,158

SYSTEM FOR COLLECTING ORGANIC MATERIAL UNDERNEATH RAIL VEHICLES

BACKGROUND OF THE INVENTION

1. Field of the Invention

The present invention relates to a system for collecting organic material, such as oil, etc., underneath rail vehicles, in particular railway locomotives, the system having a plurality of pans which are combined with one another in the manner of a modular system, with neighbouring pans being fastened to one another by means of clamps or sections that cover neighbouring edges of the pans.

2. The Prior Art

Systems that have so far been used for collecting liquids underneath rail vehicles are formed by one-part pans which are, for instance, positioned in the station area at places where a locomotive will later be stopped in order to collect oil, etc. which is dripping from the locomotive.

The pans of the prior art entail, in particular, the risk that railway workers may slip on the oil contained in the pan. Moreover, it may happen when used pans are transported away that oil will be spilled, which is regarded as a disadvantage under environmental aspects. Monitoring and emptying of the pans sometimes pose great problems on extensive railway ground.

SUMMARY OF THE INVENTION

It is therefore the object of the present invention to provide a system which is easy to handle and used for collecting organic material, such as oil, etc. underneath rail vehicles, in particular railway locomotives, in which any risk of slippage is eliminated and an ecologically acceptable disposal is ensured.

The above object is attained according to the invention with a system of the above-mentioned type which is characterized in that each pan has provided therein an absorption material in the form of a first absorptive nonwoven fabric which is covered by at least one second absorptive nonwoven fabric at least partly, the latter lapping over the edge of the pan, and that a net is stretched over the respectively uppermost layer of absorptive nonwoven fabric.

The absorption material absorbs any kind of liquid, i.e. especially oil leaking from a rail vehicle, so that there will no longer be any risk of slippage for railway workers. Furthermore, spilling of oil or the like is excluded when the pans are transported away after their use. Hence, there will no longer be any risk of pollution.

Oil collecting pans that have so far been known had to keep a certain distance along their sides from the screw connections of the rails on the sleepers and from the sleepers themselves to allow for dimensional tolerances of the screw connections and also for the distances of sleepers from one another.

Nevertheless, in order to be able to cover the whole area underneath rail vehicles entirely, the invention provides for the combination of a plurality of pans with one another in the manner of a modular system.

To prevent gaps which are caused by an excessive spacing between adjacent pans when the area below the rail vehicles is covered, the invention provides for neighbouring pans that are fastened to each other by clamps or sections gripping over neighbouring edges of the pans.

Furthermore, it is possible with the modular system to replace or renew only individual elements in response to the degree of soiling while less soiled elements may remain on the spot.

To prevent water from penetrating into the edge portion of the pan, the invention suggests that each of the pans should have provided therein a first absorptive nonwoven fabric which is at least partly covered by at least one second absorptive nonwoven fabric, the latter lapping over the edge of the pan.

Furthermore, in order to reliably cover possibly remaining interspaces between pans, at least one of the second absorptive nonwoven fabrics may lap over neighbouring edges of neighbouring pans according to the invention.

To cover the area of the screw connections of the rails on the sleepers, tunnel or bridgelike pans are preferably provided according to the invention.

According to the invention there may also be provided roofs (141 to 145, 151 to 156) for covering the screw connections of the rails (12, 14) on sleepers (22, 24, 26), the pans (32 to 36, 41 to 46) which are respectively adjacent to the roofs (141 to 145, 151 to 156) comprising recesses for surrounding the roofs (141 to 145, 151 to 156).

According to the invention fastening elements may also be provided for fastening the pan(s) to the rails.

The fastening elements may comprise elastic and barb-like sections. This permits rapid and easy fastening of the pans to and detachment from the rails.

In addition, or alternatively, locking means (162 to 168) may also be provided according to the invention for locking adjacent pans (32 to 36, 41 to 46).

Finally, in order to keep the whole system together and to protect it against mechanical damage, the invention provides for a net which is stretched over the respectively uppermost layer of absorptive nonwoven fabric.

BRIEF DESCRIPTION OF THE DRAWINGS

The invention shall now be explained in more detail with reference to preferred embodiments taken in conjunction with the attached drawings including further details, in which.

DETAILED DESCRIPTION OF PREFERRED EMBODIMENTS

Figure 1:
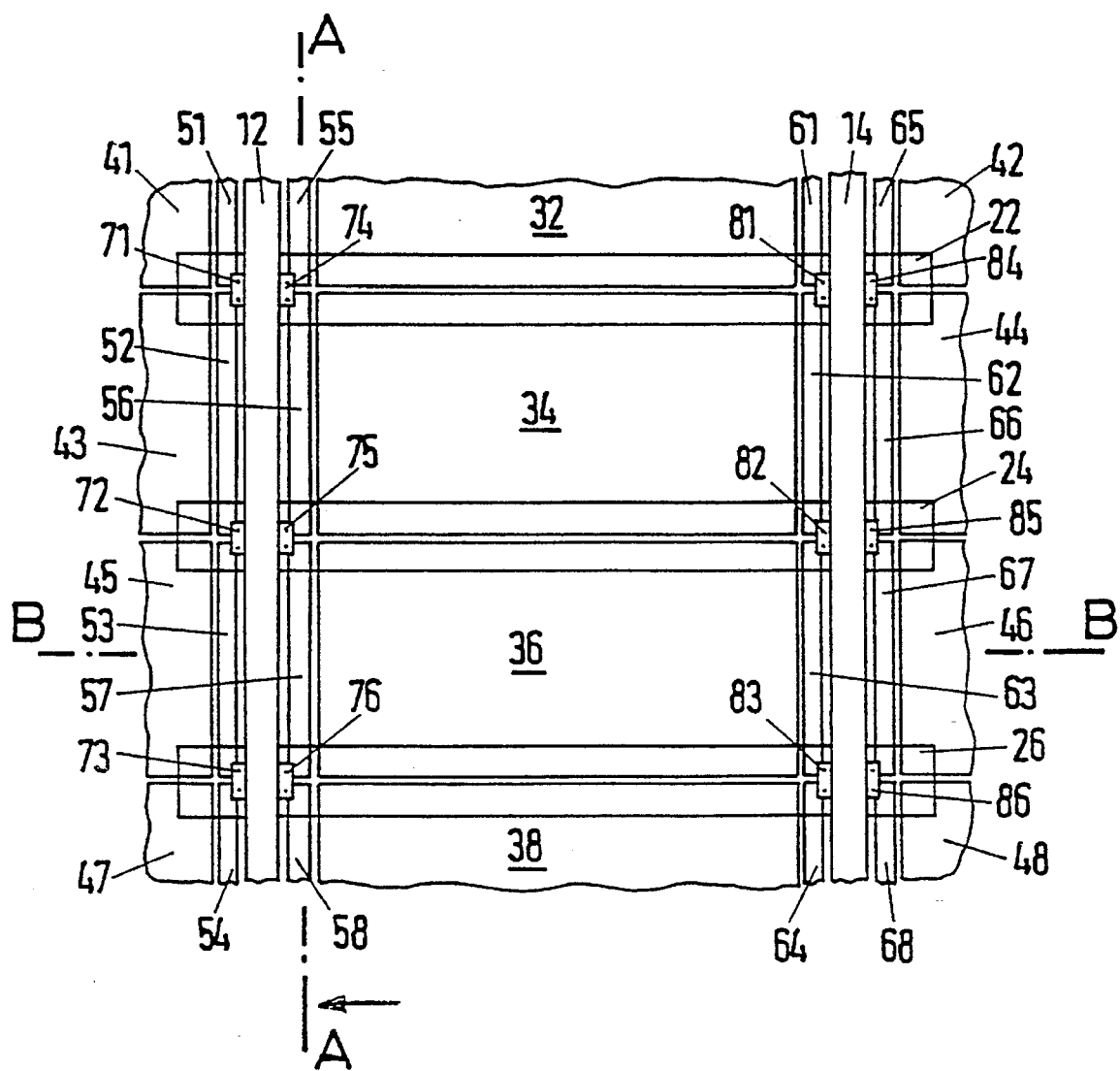
FIG. 1 is a top view on tracks including the system of the invention.

FIG. 1 shows rails 12, 14 and sleepers 22, 24, 26 to which the rails are screwed. The screw connections 71 to 76 and 81 to 86, respectively, are drawn only schematically for the sake of clarity.

Large pans 32 to 38 as well as small pans 55 to 58 and 61 to 64, respectively, are positioned between the rails. Pans to 48, 51 to 54 and 65 to 68 are positioned at the right and left sides of the rails.

As can easily be gathered from FIG. 1, the whole area below a rail vehicle possibly standing on the rails is almost entirely covered by pans. The pans are shown in their empty state in FIG. 1 for the sake of clarity.

Figure 2:
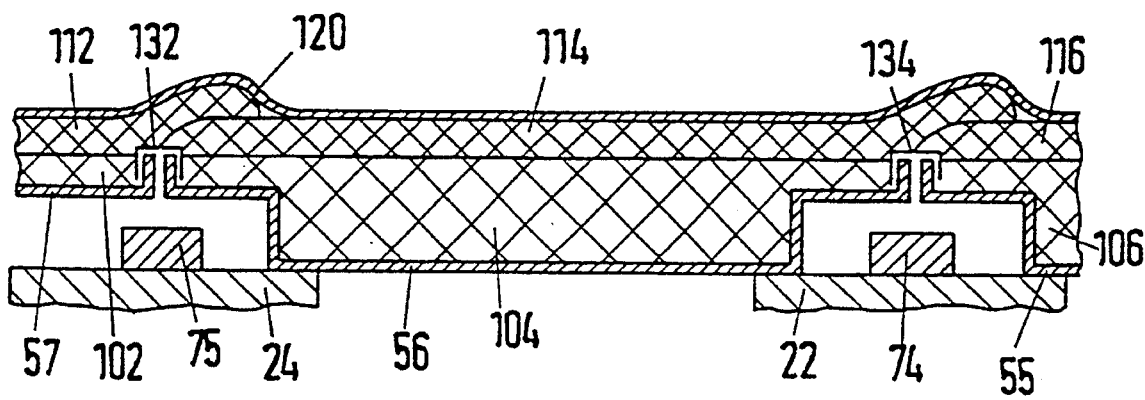
FIG. 2 shows a section taken along line A—A in Figure.
Figure 3:
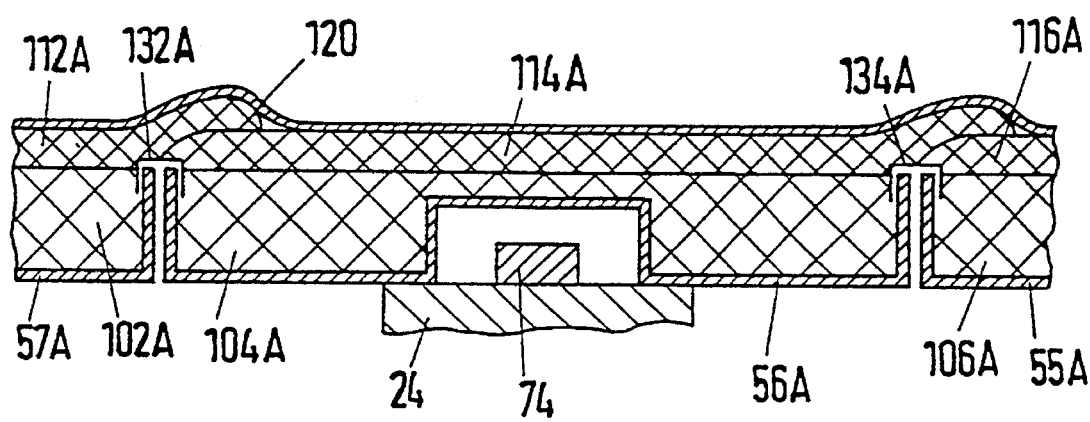
FIG. 3 shows a section along lines A—A in FIG. 1, but according to an alternative embodiment of the invention.

FIGS. 2 and 3 are sectional views along line A—A in FIG. 1. As becomes apparent from FIGS. 2 and 3, a first absorptive nonwoven fabric 102, 104, 106 and 102A, 104A, 106A, respectively, is positioned in the pans. The absorptive nonwoven fabric substantially fills the pan. A second layer of absorptive nonwoven fabric 112, 114, 116 and 112A, 114A, 116A, respectively, is positioned above said first absorptive nonwoven fabric, the last-mentioned layer of absorptive nonwoven fabric lapping over the edge portion of the respective pan on the one hand and the respectively next edge of the respectively adjacent pan on the other hand. This guarantees that no water will penetrate into the edge portion of the pans. Furthermore, possibly existing spaces between adjacent pans are covered by absorptive nonwoven fabric, so that no oil will flow onto the ground.

Neighbouring pans are held together by means of clamps 132, 134 and 132A, 134A, respectively, to prevent any displacement caused by vibrations.

Slippage of the uppermost layer of absorptive nonwoven fabric as well as mechanical damage are excluded by a net 120 which covers the whole system.

It should here be noted that although each of FIGS. 2 and 3 just shows pans 55, 56, 57, it is self-evident that all of the other pans may be equipped in the same way with absorptive nonwoven fabric and with the net stretched thereabove, with identical overlaps being provided and neighbouring pans being fastened to one another by means of clamps.

According to FIGS. 1 and 2, neighbouring pans 55 and 56 and 56 and 57, respectively, abut on each other exactly in the area of screw connections 74 and 75, respectively. Pans 55, 56, 57 are therefore designed in their respective edge portions in such a way that they extend beyond the screw connections 74 and 75, respectively, to protect them against soiling by oil.

Alternatively, the system according to the invention may be designed, as illustrated in FIG. 3, in such a way that the pans arranged next to rails 12 and 14, respectively, are shaped like a tunnel in their center portion, thereby covering screw connections 74, 75 in their center portion as well.

The tunnel-shaped portion which is formed either by abutting pans or by the center portion of an individual pan and which covers the screw connection should be dimensioned such that there remains sufficient space along the three sides of the screw connection that are not next to the rail so as to be able to compensate for possible tolerances of the distances between the sleepers from one another and the lateral expansion of the screw connections.

Figure 4:
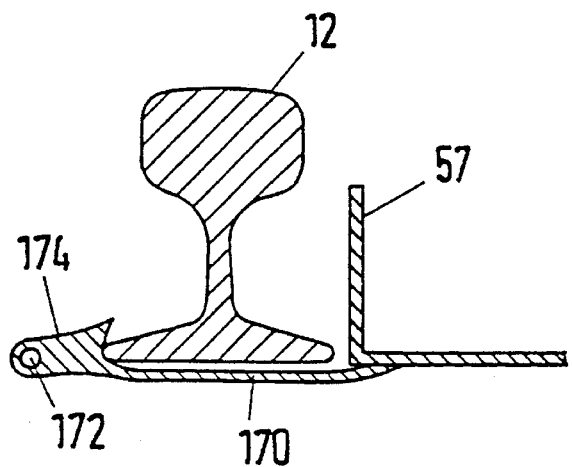
FIG. 4 shows an embodiment of a fastening element.

FIG. 4 shows a section along line B—B in FIG. 1. A fastening element 170, 172, 174 which is mounted on pan 57 extends according to this representation below rail 12 up to the opposite side where it surrounds the base of rail 12 by means of a barb-like structure 174. The section 170 of the fastening element is here made elastic. An eye 172 is used for a gripping operation by hand or with a corresponding tool.

Figure 5:
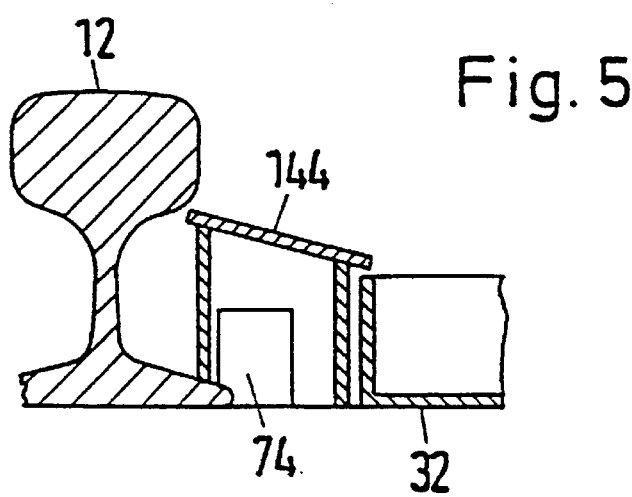
FIG. 5 is a sectional view of an embodiment of a roof.
Figure 6:
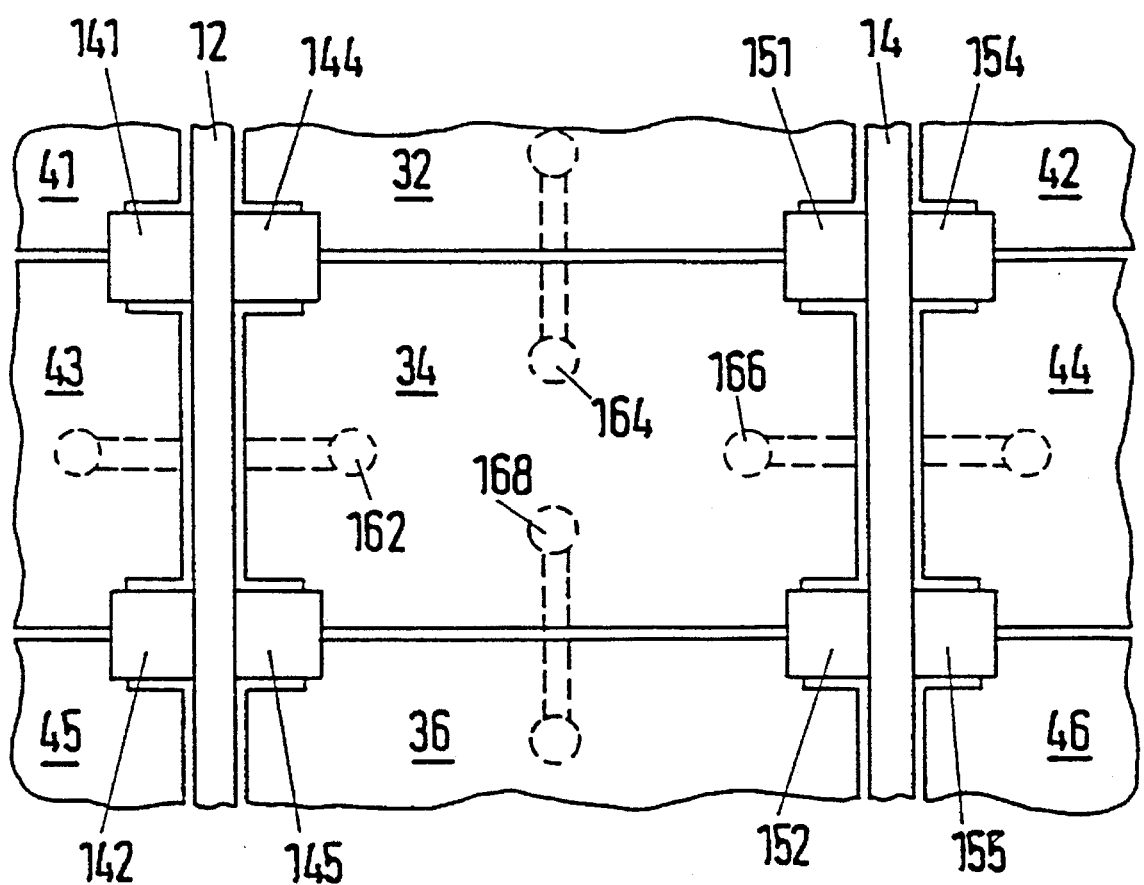
FIG. 6 is a top view of the rail-way tracks with another embodiment of the system according to the invention.

FIGS. 5 and 6 show an alternative embodiment of the invention.

As illustrated in FIG. 5, a roof 144 covers the screw connection 74 of the rail 12 on the sleeper positioned thereunder (not shown).

As illustrated in FIG. 6, the center pans 32, 34 and 36 as well as the exterior pans 41 to 46 extend directly up to the rail without small pans being provided therebetween. In this case the pans have recesses with which they surround roofs 141 to 155, the roofs having an inclined upper side projecting beyond the edge of the respectively adjacent pan, so that oil and the like which drips from above onto the screw connection and the roof positioned thereabove, respectively, is introduced into the respectively neighbouring pans.

Locking means 162 to 168 which are positioned below the pans and possibly extend below the rails are used alternatively or in addition to the above-mentioned clamps 132, 134 for fastening and locking the pans to one another and to the rails.

It should explicitly be noted that the two above-mentioned methods for fastening pans to rails are only described by way of example and that there are of course other fastening possibilities, too.

Polypropylene, in particular, is suited as a material for the absorptive nonwoven fabric.

The pans as well as the net are preferably made of a plastic material which is UV resistant and also resistant to chemicals, in particular polyethylene. The features of the invention which have been disclosed in the above description, the drawing and the claims may be of essential importance to the implementation of the invention in its different embodiments either individually or in any desired combinations.

What is claimed is:

1. A system for collecting organic material underneath rail vehicles, said system comprising:

a plurality of pans which are combined with each other in the manner of a modular system, with adjacent pans being fastened to one another by clamp means gripping over neighboring edges of said pans;

each of said pans has provided therein an absorption material in the form of a first absorptive nonwoven fabric;

at least one second absorptive nonwoven fabric at least partly covering said first fabric and said second fabric lapping over the edge of said pan; and a net stretched over the respectively uppermost layer of absorptive nonwoven fabric.

2. A system according to claim 1, wherein at least one of said second absorptive nonwoven fabrics laps over neighboring edges of adjacent pans.

3. A system according to claim 1, wherein said pans are provided with tunnel-like or bridge-like sections.

4. A system according to claim 1, wherein the pans extend between rails which rails are connected to sleepers with screw connections, the system further comprising roofs for covering screw connections of said rails on sleepers;

the pans which are respectively adjacent to said roofs comprising recesses for surrounding said roofs.

5. A system according to claim 1, further comprising fastening elements for fastening said pans to said rails.

6. A system according to claim 5, wherein said fastening elements comprise elastic and barb-shaped sections.

7. A system according to claim 1, further comprising locking means for locking adjacent pans to one another.

* * * * *